(12) United States Patent
Zhou et al.

(10) Patent No.: US 7,957,257 B2
(45) Date of Patent: Jun. 7, 2011

(54) COMMUNICATION SYSTEMS (75) Inventors: Yuefeng Zhou, Haywards Heath (GB); Michael John Beems Hart, London (GB); Sunil Keshavji Vadgama, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 925 days.

(21) Appl. No.: 11/840,595

(22) Filed: Aug. 17, 2007

(65) Prior Publication Data
US 2008/0043710 A1    Feb. 21, 2008

(30) Foreign Application Priority Data

Aug. 18, 2006   (GB) .................................. 0616482.6

(51) Int. Cl.
H04L 5/06     (2006.01)
H04B 7/208    (2006.01)
H04B 7/212    (2006.01)
H04W 72/00    (2009.01)

(52) U.S. Cl. ........ 370/204; 370/319; 370/344; 370/348; 455/450

(58) Field of Classification Search .......... 370/203–211, 370/310, 315–350; 375/130–150; 455/449–456.6
See application file for complete search history.

(56) References Cited

U.S. PATENT DOCUMENTS

| | | |
|---|---|---|
| 5,719,868 A | 2/1998 | Young |
| 6,370,384 B1 | 4/2002 | Komara |
| 6,701,129 B1 | 3/2004 | Hashem et al. |
| 7,096,274 B1 | 8/2006 | Ci et al. |
| 2002/0080816 A1 | 6/2002 | Spinar et al. |
| 2003/0054771 A1 | 3/2003 | Chappaz |
| 2004/0005861 A1 | 1/2004 | Tauchi |
| 2004/0100929 A1 | 5/2004 | Garcia-Luna-Aceves |
| 2004/0109428 A1 | 6/2004 | Krishnamurthy |
| 2005/0030887 A1* | 2/2005 | Jacobsen et al. |
| 2005/0048914 A1 | 3/2005 | Sartori et al. |
| 2006/0023745 A1* | 2/2006 | Koo et al. |
| 2006/0256741 A1 | 11/2006 | Nozaki |

(Continued)

FOREIGN PATENT DOCUMENTS

EP    0 151 280    12/1984

(Continued)

OTHER PUBLICATIONS

IEEE Std 802.16a-2003 (Amendment to IEEE Std 802.16-2001), IEEE Standard for Local and Metropolitan Area Networks Part 16: Air Interface for Fixed Broadband Wireless Access Systems—Amendment 2: Medium Access Control Modifications and Additional Physical Layer Specifications for 2-11 GHz, Apr. 2003, IEEE, pp. i, 115-116, 119, 156-158 and 182-183.*

(Continued)

Primary Examiner — Tri H Phan
(74) Attorney, Agent, or Firm — Baker Botts L.L.P.

(57) ABSTRACT

A transmission method for use in a multi-hop wireless communication system is provided. The method includes, for two apparatuses having overlapping transmission coverage areas, one of the two said apparatuses being an intermediate apparatus, transmitting a first transmission signal from a first one of those apparatuses in a first transmission window of a particular transmission interval and transmitting a second transmission signal from the second one of those apparatuses in a second transmission window of the particular transmission interval but not in said first transmission window, so that a communication apparatus located in the coverage areas of both the first and second apparatuses can receive said first transmission signal substantially without interference from said second transmission signal.

20 Claims, 7 Drawing Sheets

An example of the operations to allocate RS region

U.S. PATENT DOCUMENTS

| | | | |
|---|---|---|---|
| 2006/0264172 A1 | 11/2006 | Izumikawa et al. | |
| 2007/0217539 A1* | 9/2007 | Ihm et al. | 375/267 |
| 2008/0039107 A1* | 2/2008 | Ma et al. | 455/450 |
| 2008/0043816 A1* | 2/2008 | Hart et al. | 375/135 |
| 2008/0043817 A1* | 2/2008 | Beems Hart et al. | 375/135 |
| 2008/0212512 A1* | 9/2008 | Harpek et al. | 370/315 |
| 2009/0097433 A1* | 4/2009 | Shen et al. | 370/315 |
| 2009/0129334 A1* | 5/2009 | Ma et al. | 370/331 |
| 2010/0128654 A1* | 5/2010 | Zhou et al. | 370/315 |
| 2010/0189050 A1* | 7/2010 | Beems Hart et al. | 370/329 |

FOREIGN PATENT DOCUMENTS

| | | | |
|---|---|---|---|
| EP | 1 617 693 | | 1/2006 |
| EP | 1 635 592 | | 3/2006 |
| EP | 1 677 443 | | 7/2006 |
| EP | 1 804 430 | A1 | 7/2007 |
| WO | WO 99/44341 | | 9/1999 |
| WO | WO 01/76289 | | 10/2001 |
| WO | WO 03/058984 | | 7/2003 |
| WO | WO 2004/056013 | | 7/2004 |
| WO | WO 2004/107693 | * | 12/2004 |
| WO | WO 2005/067173 | | 7/2005 |
| WO | WO 2005/067173 | A1 | 7/2005 |
| WO | WO 2006/012554 | | 2/2006 |
| WO | WO 2006/065069 | | 6/2006 |
| WO | WO 2006/098608 | * | 9/2006 |
| WO | WO 2006/120161 | | 11/2006 |

OTHER PUBLICATIONS

IEEE Std 802.16-2004 (Revision of IEEE Std 802.16-2001), IEEE Standard for Local and Metropolitan Area Networks Part 16: Air Interface for Fixed Broadband Wireless Access Systems, Oct. 2004, IEEE, pp. i, ii, iv, 164, 307, 496-501, 605 and 610.*

IEEE P802.16e/D12, Draft IEEE Standard for Local and Metropolitan Area Networks Part 16: Air Interface for Fixed Broadband Wireless Access Systems—Amendment for Physical and Medium Access Control Layers for Combined Fixed and Mobile Operation in Licensed Bands, Oct. 2005, IEEE, pp. i and 279-280.*

Communication from the European Patent Office, European Search Report for Application No. EP 07 11 3538, Dec. 27, 2007, 7 pages.*

Communication from the European Patent Office, European Search Report for Application No. EP 07113557.8-1525, Dec. 3, 2007, 7 pages.

The Patent Office, Search Report under Section 17, U.K. Application No. GB0616482, date of search Oct. 27, 2006, 1 page.

The Patent Office, Search Report under Section 17, U.K. Application No. GB0616471, date of search Oct. 27, 2006, 1 page.

The Patent Office, Search Report under Section 17, U.K. Application No. GB0616477, date of search Oct. 27, 2006, 1 page.

The Patent Office, Search Report under Section 17, U.K. Application No. GB0616472, date of search Nov. 3, 2006, 1 page.

The Patent Office, Search Report under Section 17, U.K. Application No. 0616479, date of search Oct. 27, 2006, 1 page.

The Patent Office, Search Report under Section 17, U.K. Application No. 0622124, date of search Dec. 7, 2006, 1 page.

The Patent Office, Search Report under Section 17, U.K. Application No. 0622122, date of search Nov. 28, 2006, 1 page.

IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.

Hart et al., "Relay Midamble," IEEE 802.16 Broadband Wireless Access Working Group < http://ieee802.org/16>, pp. 0-3, Nov. 6, 2006.

Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9, Nov. 2006.

Hart et al., >, "TDD MR Frame Structure," IEEE 802.16 Broadband Wireless Access Working Group < http://ieee802.org/16>, pp. 1-10, Oct. 20, 2006.

Hart, "Dimensioning and System Level Analysis of an HSDPA Network with Relaying Nodes," 5 pages, 2005.

Chu, "Polyphase Codes with Good Periodic Correlation Properties," IEEE Transactions on Information Theory, Jul. 1972, pp. 531-532.

Frank et al., "Phase Shift Pulse Codes with Good Periodic Correlation Properties," IRE Transactions on Information Theory, pp. 381-382, Oct. 1962.

Milewski, "Periodic Sequences with Optimal Properties for Channel Estimation and Fast Start-Up Equalization," IBM Research and Development Journal, pp. 426-431, Sep. 1983.

Hart, "Optimal Transmit Power Balancing in Multi-Hop Networks," Fujitsu Laboratories of Europe, Ltd., 6 pages, 2005.

Golay, "Multi-Slit Spectrometry," Journal of the Optical Society of America, vol. 39, No. 6, pp. 437-444, Jun. 1949.

Golay, "Complementary Series," IRE Transactions on Information Theory, IT 7, pp. 82-87, Apr. 1961.

Zhou et al., "Communication Systems," Pending U.S. Appl. No. 11/840,492, filed Aug. 17, 2007.

Zhou et al., "Communication Systems," Pending U.S. Appl. No. 11/840,518, filed Aug. 17, 2007.

Hart et al., "Communication Systems," Pending U.S. Appl. No. 11/840,546, filed Aug. 17, 2007.

Hart et al., "Communication Systems," Pending U.S. Appl. No. 11/840,570, filed Aug. 17, 2007.

Zhou et al., "Communication Systems," Pending U.S. Appl. No. 11/840,595, filed Aug. 17, 2007.

Hart et al., "Communication Systems," Pending U.S. Appl. No. 11/840,621, filed Aug. 17, 2007.

Hart et al., "Communication Systems," Pending U.S. Appl. No. 11/840,644, filed Aug. 17, 2007.

Hart et al., "Communication Systems," Pending U.S. Appl. No. 11/840,669, filed Aug. 17, 2007.

Hart et al., "Communication Systems," Pending U.S. Appl. No. 11/840,429, filed Sep. 7, 2007.

Hart et al., "Communication Systems," Pending U.S. Appl. No. 11/840,430, filed Sep. 7, 2007.

Hart et al., "Wireless Communication Systems," Pending U.S. Appl. No. 11/856,139, filed Sep. 17, 2007.

Hart et al., "Wireless Communication Systems," Pending U.S. Appl. No. 11/856,145, filed Sep. 17, 2007.

Hart et al., "Communication Systems," Pending U.S. Appl. No. 11/856,178, filed Sep. 17, 2007.

KIPO's Notice of Preliminary Rejection (w/ english translation); Korean Patent Application No. 10-2007-83042; pp. 7, May 21, 2009.

Communication from the European Patent Office, European Search Report for Application No. EP 08 15 8421, Oct. 21, 2008, 1 pages.

Communication from the European Patent Office, European Search Report for Application No. EP 07 11 3481, Oct. 19, 2007, 1 pages.

Kaneko et al., "Proposed Relay Method with P-MP Structure of IEEE802.16/2004," 2005 IEEE 16th International Symposium on Personal, Indoor and Mobile Radio Communications, pp. 1606-1610, Sep. 11, 2005 through Sep. 14, 2005.

Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.

Etri et al, Transmission of IP Packets over Ethernet over IEEE 802.16, draft-riegel-l6ng-ip-over-eth-over-80216-01.txt, Oct. 1, 2006, pp. 1-16.

Kim et al., Fair and Efficient Multihop Scheduling Algorithm for IEEE 802.16 BWA Systems, pp. 895-901, Oct. 3-7, 2005.

European Patent Office, European Search Report for Application No. EP 08 15 5435, Aug. 1, 2008, 8 pages.

European Patent Office, European Search Report for Application No. EP 07 11 3483, Sep. 26, 2007, 6 pages.

IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.

Hart et al., "Factors That Affect Performance of a Mobile Multihop Relay System," IEEE 802.16 Presentation Submission Template (Rev.8.3), Sep. 13, 2005, 19 pages.

Relay Task Group of IEEE 802.16, "Part 16: Air Interface for Fixed and Mobile Broadband Wireless Access Systems," Multihop Relay Specification, p. 1-12 and 78-104, Jun. 6, 2007.

\* cited by examiner

Fig.1

Examples of RS region

Fig.2

WiMAX relay system

Fig.3

An example of the operations to allocate RS region

Fig.4

A BS can directly instruct an RS region without any request from RSs

Figure 7: Example TDD frame structure from OFDMA physical layer of the IEEE802.16 standard

COMMUNICATION SYSTEMS

RELATED APPLICATION

This application claims foreign priority benefits under 35 U.S.C. §119 of United Kingdom Application No. GB 0616482.6, filed on Aug. 18, 2006, entitled "Communication Systems".

CROSS-REFERENCE TO RELATED APPLICATIONS

This application relates to the following applications, each of which is incorporated herein by reference:
COMMUNICATION SYSTEMS, application Ser. No. 11/840,492, filed Aug. 17, 2007 and currently pending;
COMMUNICATION SYSTEMS, application Ser. No. 11/840,518, filed Aug. 17, 2007 and currently pending;
COMMUNICATION SYSTEMS, application Ser. No. 11/840,546, filed Aug. 17, 2007 and currently pending;
COMMUNICATION SYSTEMS, application Ser. No. 11/840,570, filed Aug. 17, 2007 and currently pending;
COMMUNICATION SYSTEMS, application Ser. No. 11/840,621, filed Aug. 17, 2007 and currently pending;
COMMUNICATION SYSTEMS, application Ser. No. 11/840,644, filed Aug. 17, 2007 and currently pending;
COMMUNICATION SYSTEMS, United Kingdom Application No. GB 0616478.4, filed on Aug. 18, 2006;
COMMUNICATION SYSTEMS, United Kingdom Application No. GB 0616475.0, filed on Aug. 18, 2006; and
COMMUNICATION SYSTEMS, United Kingdom Application No. GB 0616476.8, filed on Aug. 18, 2006.

TECHNICAL FIELD

This invention relates in general to communication systems, and more particularly to providing safe communications among relay stations.

OVERVIEW

Currently there exists interest in the use of multihop techniques in packet based radio and other communication systems, where it is purported that such techniques will enable both extension in coverage range and increase in system capacity (throughput).

Figure 5:
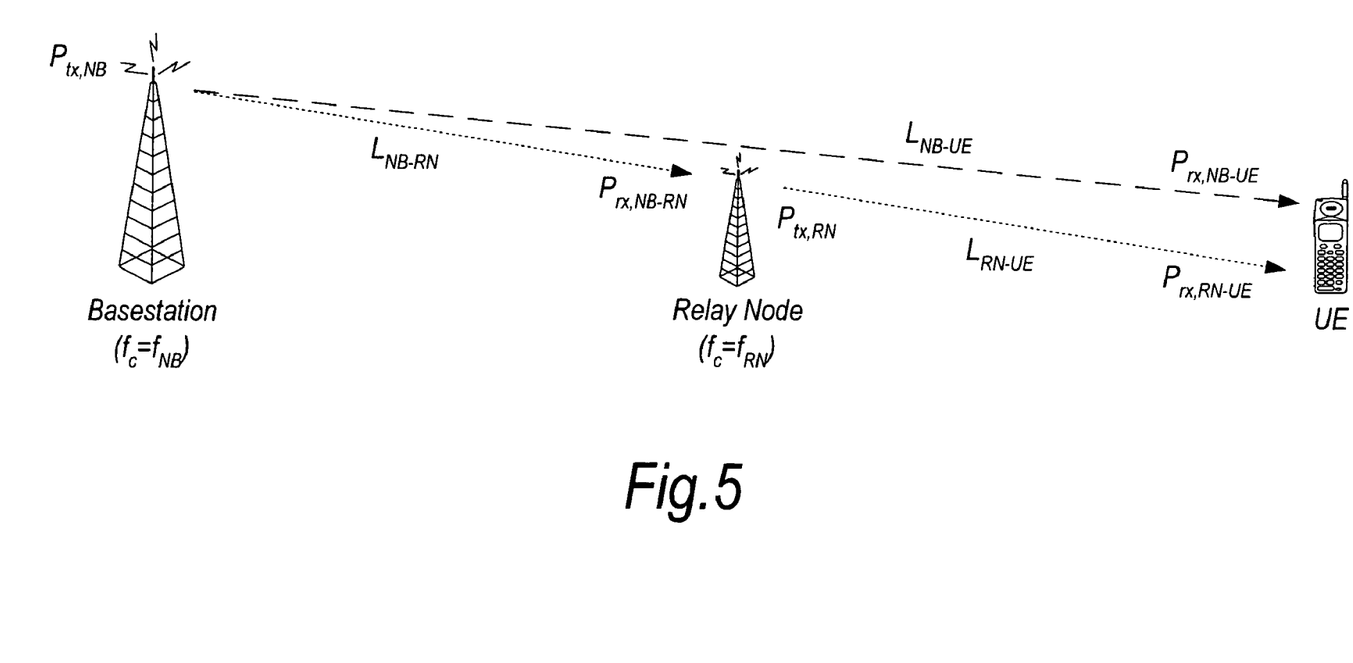
FIG. 5 shows a single-cell two-hop wireless communication system.

In a multi-hop communication system, communication signals are sent in a communication direction along a communication path (C) from a source apparatus to a destination apparatus via one or more intermediate apparatuses. FIG. 5 illustrates a single-cell two-hop wireless communication system comprising a base station BS (known in the context of 3G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

Figure 6A:
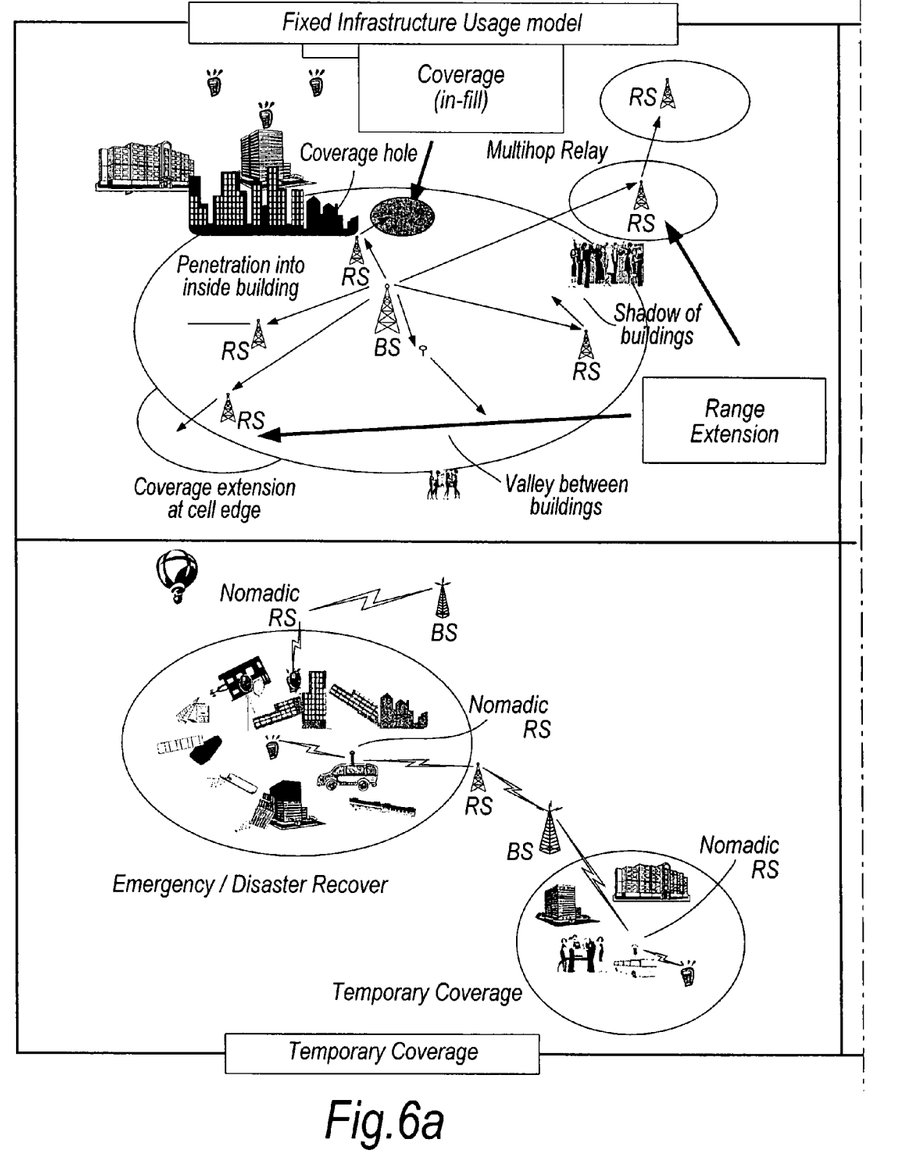
FIGS. 6A & 6B show applications of relay stations.
Figure 6B:
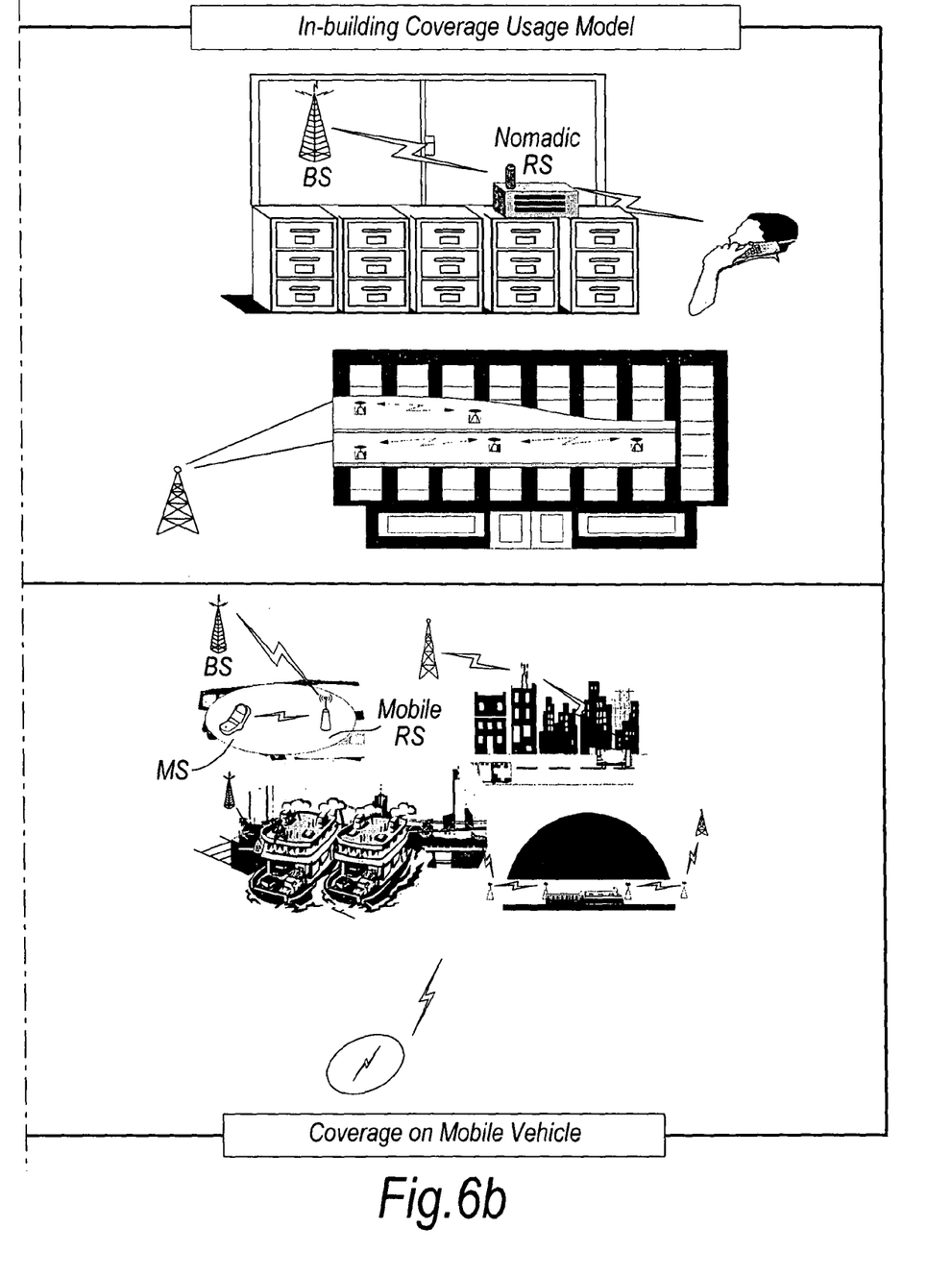

FIGS. 6A & 6B illustrate a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 6B is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 6A provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modeled by:

$$L=b+10n \log d \quad\quad\quad (A)$$

Where d (meters) is the transmitter-receiver separation, b(db) and n are the pathloss parameters and the absolute pathloss is given by $l=10^{(L/10)}$.

The sum of the absolute path losses experienced over the indirect link SI+ID may be less than the pathloss experienced over the direct link SD. In other words it is possible for:

$$L(SI)+L(ID)<L(SD) \quad\quad\quad (B)$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE 802.11 a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both subcarriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, 0 \leq t \leq T_s \quad (1)$$

where $\Delta f$ is the sub-carrier separation in Hz, $T_s=1/\Delta f$ is symbol time interval in seconds, and $c_n$ are the modulated source signals. The sub-carrier vector in (1) onto which each of the source signals is modulated $c \in C_n$ $c=(c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode.

Figure 7:
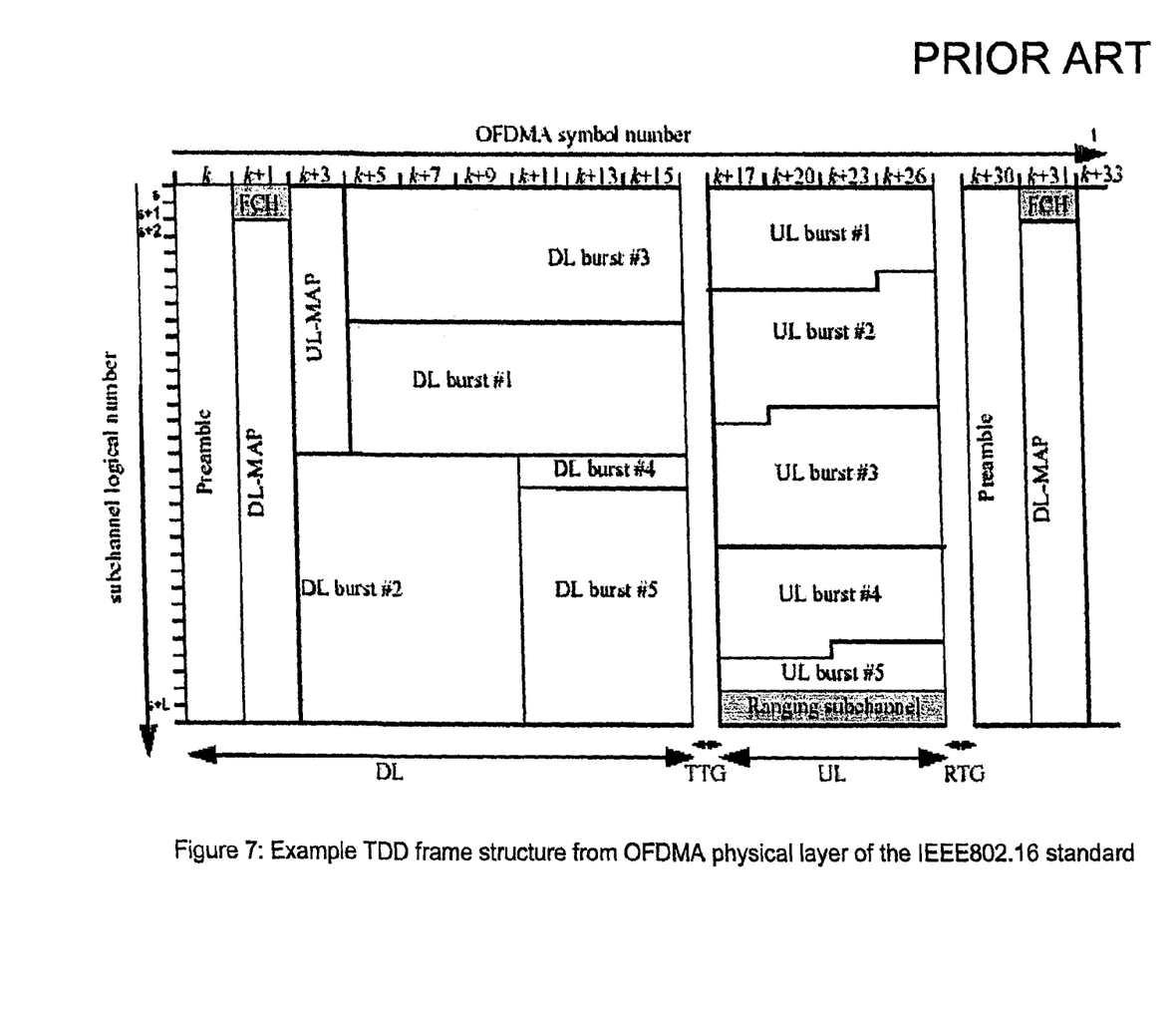
FIG. 7 shows a single hop TDD frame structure used in the OFDMA physical layer mode of the IEEE 802.16 standard.

As an example, FIG. 7 illustrates the single hop TDD frame structure used in the OFDMA physical layer mode of the IEEE 802.16 standard (WiMAX). Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP. The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

In accordance with one embodiment of the present invention, a transmission method for use in a multi-hop wireless communication system is provided. The system includes a source apparatus, a destination apparatus and one or more intermediate apparatuses. The source apparatus is operable to transmit information in a communication direction along a series of links forming a communication path extending from the source apparatus to the destination apparatus via the intermediate apparatus. The intermediate apparatus is operable to receive information from a previous apparatus along the path and to transmit the received information to a subsequent apparatus along the path. The system has access to a time-frequency format for use in assigning available transmission frequency bandwidth for transmission in the communication direction during a discrete transmission interval, said format defining a plurality of transmission windows within such an interval. Each window occupies a different part of that interval and having a frequency bandwidth profile within said available transmission frequency bandwidth over its part of that interval, and each said window is assignable for such a transmission interval to one of said apparatuses for use in transmission. The method for use in this system includes, for two said apparatuses having overlapping transmission coverage areas, one of the two said apparatuses being an intermediate apparatus, transmitting a first transmission signal from a first one of those apparatuses in a first transmission window of a particular transmission interval and transmitting a second transmission signal from the second one of those apparatuses in a second transmission window of the particular transmission interval but not in said first transmission window, so that a communication apparatus located in the coverage areas of both the first and second apparatuses can receive said first transmission signal substantially without interference from said second transmission signal.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

The frame structure in relay station (RS) should be well designed to keep compatibility with the standardized frame structure (FIG. 7 shows an example of standardized TDD frame structure in IEEE 802.16 (WiMAX) standard), and avoid interference the transmission of base station (BS) and mobile station (MS). Normally, the frame structure in RS should guarantee the communication between BS and RS, BS and MS, or RS and MS. However, communication among RSs is also important. This can allow RSs to exchange information directly, thus decreasing the signaling load in BS, and benefiting distributed algorithm implementation. Particular embodiments provide a feasible method to provide safe communications among RSs.

Figure 1:
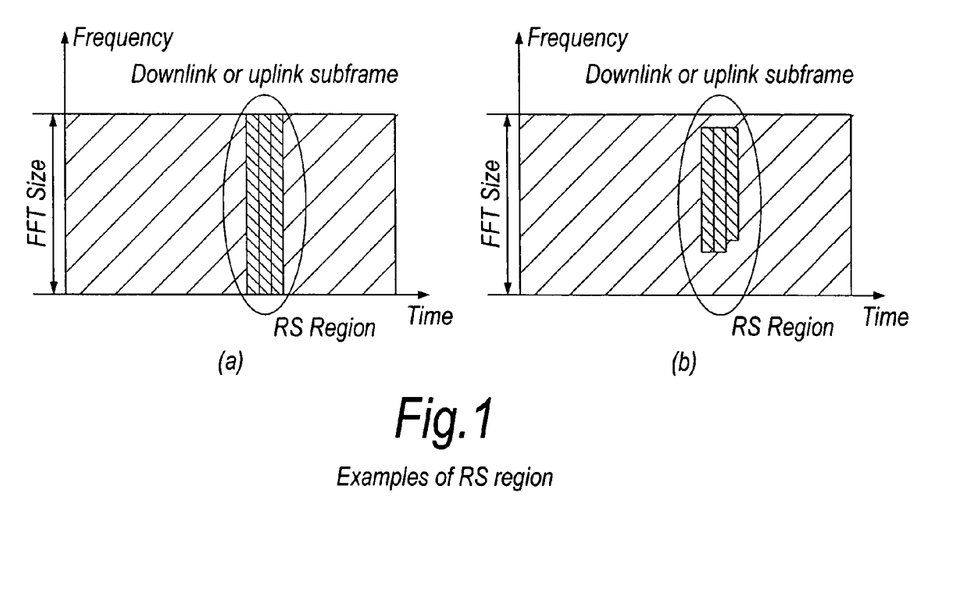
FIG. 1 shows examples of an RS region.

Definition of RS Region:

To ensure a safe communication between RSs, a BS will allocate one or multiple RS regions in downlink subframe or uplink subframe. The size of this region can be multiple OFDM symbols (FIG. 1a), or multiple slots (FIG. 1b)

Figure 2:
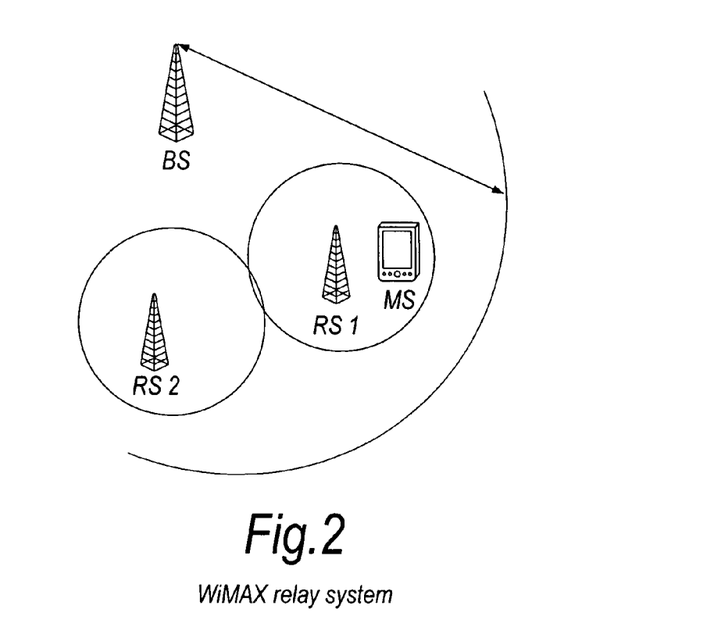
FIG. 2 shows a WiMAX relay system.
Figure 3:
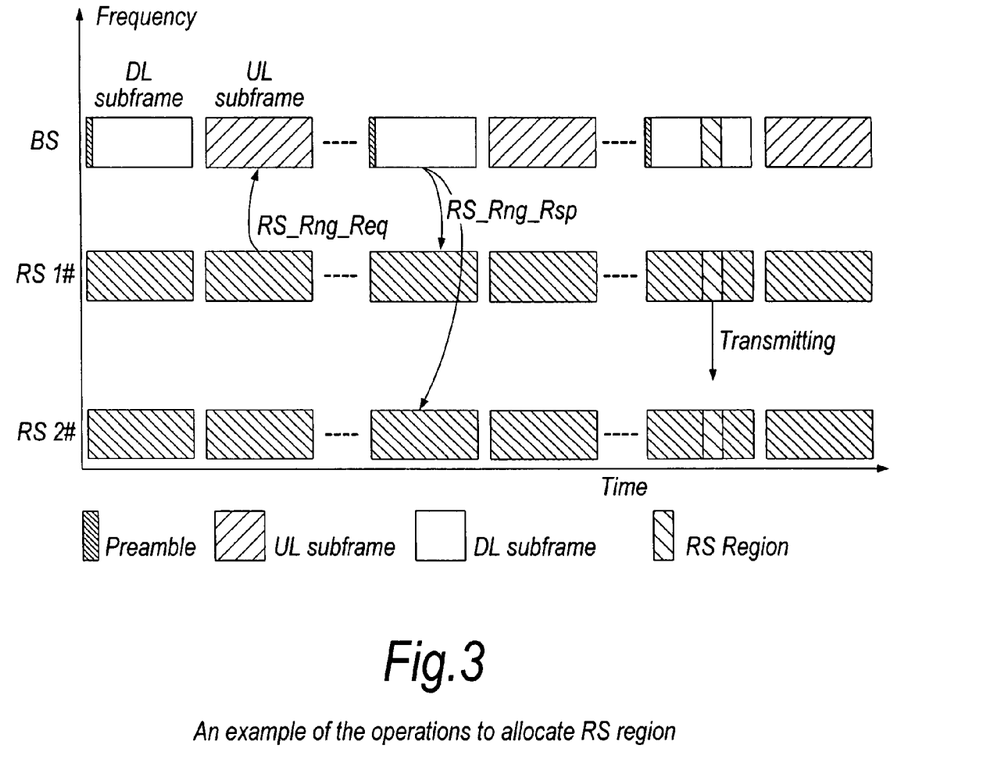
FIG. 3 shows an example of the operations to allocate RS region.

The RS region is used for RS's transmission and receiving. BS and MS will keep quiet within RS region, thus avoiding interference. Preferred regulations for RS region allocation are:
 a. The RS region will be created and synchronized in subframes in RS, BS, and MS. The allocation and size will be instructed by BS;
 b. Within RS region, MS and BS will keep quiet;
 c. BS shall indicate which RSs have the right to transmit within the RS region;
 d. One or more RSs can transmit information within a RS region;
 e. Multiple RS regions can be allocated within the duration of downlink and uplink subframes The purposes of this RS region can be
 a. Exchange information (including data, and signalling) among RSs;
 b. Exchange information (including data, and signalling) between RS and MS;
 c. Exchange information (including data, and signalling) between RS and BS;
 d. Pre-decided sequences can be added into RS region for channel sensing, and synchronization;

System Operations to Allocating RS region:

FIG. 3 shows the signaling diagram, when a relay station (FIG. 2) wants to request an RS region. In FIG. 3, RS 1# sent $RS_{13}$ $Rng_{13}$ Req to BS to request an RS region, more information relating the transmission within a RS region can be enclosed in this message. BS will send an $RS_{13}$ $Rng_{13}$ Rsp message for response. BS can deny or approve RS region allocation. More information relating the transmission within a RS region can be enclosed in this message. For example, the reasons of denying, the locating and timing information of the RS region, and access method etc. If BS approve the RS region request, the corresponding RS region will be allocated in subframes.

Figure 4:
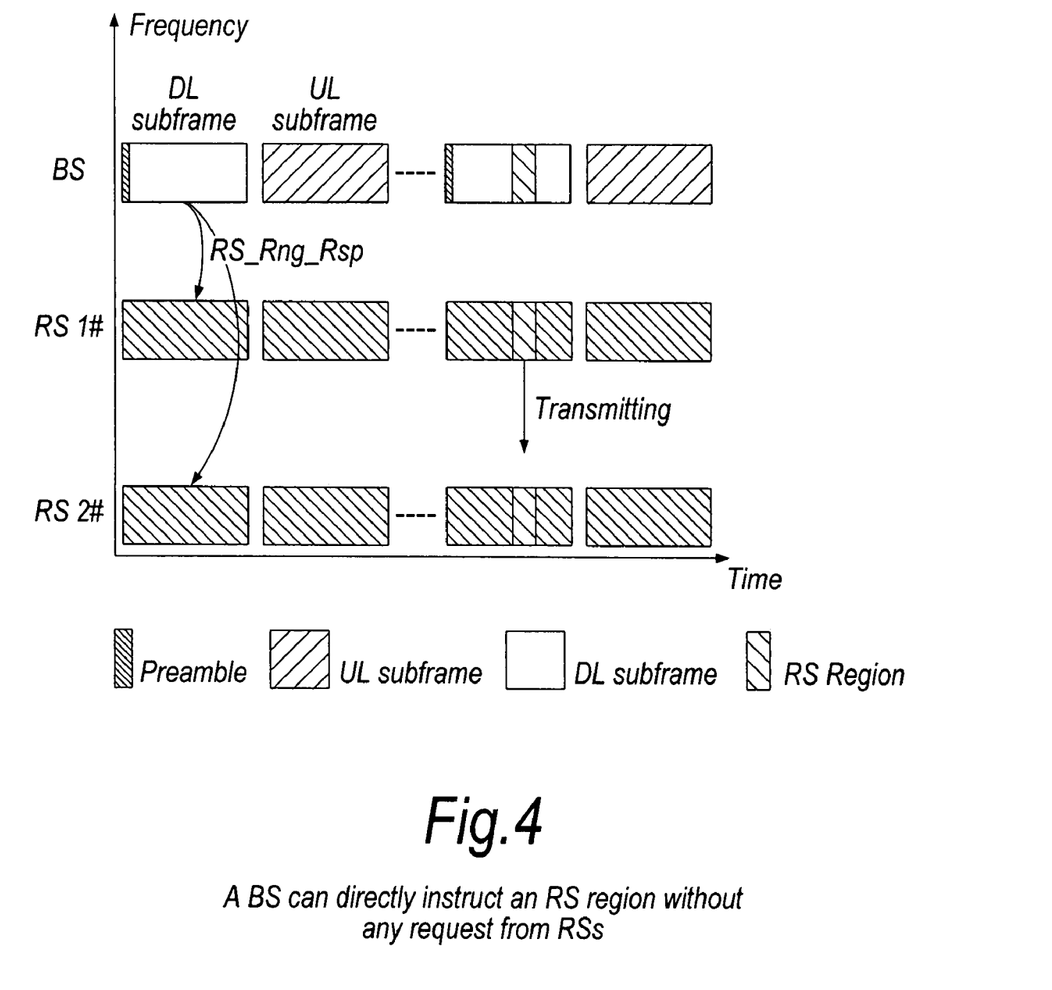
FIG. 4 shows that a BS can directly instruct an RS region without any request from RSs.

RS regions can be specified by BS directly without any request from RS. As shown in FIG. 4, the BS directly instruct an RS region for all RSs by sending $RS_{13}$ $Rng_{13}$ Rsp message. More information can be enclosed in this message.

In multi-hop relay systems, the messages, such as $RS_{13}$ $Rng_{13}$ Req, and $RS_{13}$ $Rng_{13}$ Rsp, can be relayed, thus allowing a multi-hop relay station to request RS regions.

In summary, benefits of particular embodiments may include:
1. Through the associated improvement in flexibility of frame structure (due to implement RS regions in DL subframe or UL subframe) to improve an OFDMA (such as WiMAX) system;
2. To afford a feasible way to allow RS to communicate each other, thus affording flexibility to the frame structure, and network deployment;
3. To afford more convenient for multi-hop relay systems, and distributed algorithm implementation;
4. A signaling mechanism is designed for the proposed RS region allocation method, which can be compatible with WiMAX standard;
5. More flexible for moving centralized algorithm to distributed style. A distributed implementation can release the computation and signaling load in BS;
6. The proposed region can be used for multiple purposes, such as channel sounding, handover, routing discovery and maintenance etc.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the one or more intermediate apparatuses, and the one or more intermediate apparatuses being operable to receive information from a previous apparatus along the path and to transmit the received information to a subsequent apparatus along the path, the system using a time-frequency format for transmission during a transmission period, with a plurality of transmission windows being provided within the transmission period, each window occupying a different part, said windows being assignable for transmission in the transmission period, the method comprising:
    transmitting a first transmission signal from a first apparatus, corresponding to one of said one or more intermediate apparatuses, in a first transmission window of a particular transmission period, the first transmission signal including specific intermediate apparatus information of the transmitting intermediate apparatus; and
    transmitting all of the transmission signals for transmission from said source apparatus and destination apparatus in the particular transmission period, in other transmission windows of the particular transmission period but not in said first transmission window.

2. A transmission method according to claim 1, wherein the frequency bandwidth of said first and second transmission windows extend over substantially the entire transmission frequency bandwidth for respective parts.

3. A transmission method according to claim 1, wherein said first transmission signal includes data.

4. A transmission method according to claim 1, wherein said first transmission signal includes control information.

5. A transmission method according to claim 1, wherein the second transmission signal is transmitted from the source apparatus.

6. The transmission method according to claim 1, wherein the time-frequency format is a format for a downlink or uplink sub-frame in a time-division-duplex communication system.

7. The transmission method according to claim 1, wherein said system is an OFDM or OFDMA system, and wherein the time-frequency format is a format for an OFDM or OFDMA downlink or uplink sub-frame of an OFDM or OFDMA time-division-duplex frame.

8. The transmission method according to claim 1, wherein said transmission period is a sub-frame period.

9. The transmission method according to claim 1, wherein each said transmission window comprises a region in an OFDM or OFDMA frame structure.

10. The transmission method according to claim 1, wherein each said transmission window comprises a zone in an OFDM or OFDMA frame structure.

11. The transmission method according to claim 1, wherein said source apparatus is a base station.

12. The transmission method according to claim 1, wherein said source apparatus is a user terminal.

13. The transmission method according to claim 1, wherein said destination apparatus is a base station.

14. The transmission method according to claim 1, wherein said destination apparatus is a user terminal.

15. The transmission method according to claim 1, wherein each of said one or more intermediate apparatuses is a relay station.

16. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the one or more intermediate apparatuses, and the one or more intermediate apparatuses being operable to receive information from a previous apparatus along the path and to transmit the received information to a subsequent apparatus along the path, the system using a time-frequency format for transmission during a transmission period, with a plurality of transmission windows being provided within the transmission period, each window occupying a different part, said windows being assignable for transmission in the transmission period, the method comprising:
    transmitting a first transmission signal from a first apparatus, corresponding to one of said one or more intermediate apparatuses, in a first transmission window of a particular transmission period; and
    transmitting a second transmission signal from a second apparatus, corresponding to said source apparatus or another intermediate apparatus of said one or more intermediate apparatuses, in a second transmission window of the particular transmission period but not in said first transmission window, the first apparatus and the second apparatus having overlapping transmission coverage areas, wherein said first transmission signal includes a transmission introduction sequence, said transmission introduction sequence identifying its transmitting apparatus and providing training information.

17. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the one or more intermediate apparatuses, and the one or more intermediate apparatuses being operable to receive information from a previous apparatus along the path and to transmit the received information to a subsequent apparatus along the path, the system using a time-frequency format for transmission during a transmission period, with a plurality of transmission windows being provided within the transmission period, each window occupying a different part, said windows being assignable for transmission in the transmission period, the method comprising:
    transmitting a first transmission signal from a first apparatus, corresponding to one of said one or more intermediate apparatuses, in a first transmission window of a particular transmission period; and
    transmitting a second transmission signal from a second apparatus, corresponding to said source apparatus or another intermediate apparatus of said one or more intermediate apparatuses, in a second transmission window of the particular transmission period but not in said first transmission window, the first apparatus and the second apparatus having overlapping transmission coverage areas, wherein said method further comprising requesting, by said first apparatus, assignment of said first transmission window prior to said particular transmission period.

18. A transmission method for use in a multi-hop wireless communication system, the system comprising a source apparatus, a destination apparatus and one or more intermediate apparatuses, said source apparatus being operable to transmit information in a communication direction along a series of links forming a communication path extending from the source apparatus to the destination apparatus via the one or more intermediate apparatuses, and the one or more intermediate apparatuses being operable to receive information from a previous apparatus along the path and to transmit the received information to a subsequent apparatus along the path, the system using a time-frequency format for transmission during a transmission period, with a plurality of transmission windows being provided within the transmission period, each window occupying a different part, said windows being assignable for transmission in the transmission period, the method comprising:

transmitting a first transmission signal from a first apparatus, corresponding to one of said one or more intermediate apparatuses, in a first transmission window of a particular transmission period; and transmitting a second transmission signal from a second apparatus, corresponding to said source apparatus or another intermediate apparatus of said one or more intermediate apparatuses, in a second transmission window of the particular transmission period but not in said first transmission window, the first apparatus and the second apparatus having overlapping transmission coverage areas, wherein said source apparatus assigns said first transmission window for transmission prior to said particular transmission period.

19. A multi-hop wireless communication system, comprising:

a source apparatus, a destination apparatus and one or more intermediate apparatuses, said source apparatus being operable to transmit information in a communication direction along a series of links forming a communication path extending from the source apparatus to the destination apparatus via the one or more intermediate apparatuses, and the one or more intermediate apparatuses being operable to receive information from a previous apparatus along the path and to transmit the received information to a subsequent apparatus along the path;

at least one processor configured to define a time-frequency format for transmission during a transmission period, with a plurality of transmission windows being provided within the transmission period, each window occupying a different part, said windows being assignable for transmission in the transmission period; and a first transmitter configured to transmit a first transmission signal from a first apparatus, corresponding to one of said one or more intermediate apparatuses, in a first transmission window of a particular transmission period, the first transmission signal including specific intermediate apparatus information of the transmitting intermediate apparatus; and a plurality of second transmitters configured to transmit all of the transmission signals for transmission from said source apparatus and destination apparatus in the particular transmission period, in other transmission windows of the particular transmission period but not in said first transmission window.

20. A suite of computer programs embodied in a non-transitory computer-readable medium and operable, when executed on computing devices of a multi-hop wireless communication system, causes the system to carry out a transmission method, the system comprising a source apparatus, a destination apparatus and one or more intermediate apparatuses, said source apparatus being operable to transmit information in a communication direction along a series of links forming a communication path extending from the source apparatus to the destination apparatus via the one or more intermediate apparatuses, and the one or more intermediate apparatuses being operable to receive information from a previous apparatus along the path and to transmit the received information to a subsequent apparatus along the path, the system using a time-frequency format for transmission during a transmission period, with a plurality of transmission windows being provided within the transmission period, each window occupying a different part, said windows being assignable for transmission in the transmission period, the method comprising:

transmitting a first transmission signal from a first apparatus, corresponding to one of said one or more intermediate apparatuses, in a first transmission window of a particular transmission period, the first transmission signal including specific intermediate apparatus information of the transmitting intermediate apparatus; and transmitting all of the transmission signals for transmission from said source apparatus and destination apparatus in the particular transmission period, in other transmission windows of the particular transmission period but not in said first transmission window.

* * * * *